Feb. 28, 1933. M. TIBBETTS 1,899,447
INTERNAL COMBUSTION ENGINE
Filed April 29, 1929

Inventor
Milton Tibbetts

Patented Feb. 28, 1933

1,899,447

UNITED STATES PATENT OFFICE

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed April 29, 1929. Serial No. 358,971.

This invention relates to internal combustion engines and more particularly to the type of engines in which explosions occur through heat of compression.

In four-cycle engines of the solid fuel injection type where liquid fuel and air are introduced separately into and mixed in the working cylinders there are two main difficulties encountered when the engine is designed for high speed work, namely, the introduction of a sufficient quantity of air during the suction stroke to produce complete combustion of the maximum fuel charge, and the equal distribution of the liquid fuel in the compressed air during the compression stroke.

An object of my invention is to provide an efficient engine of the class described in which the above difficulties have been overcome.

Another object of my invention is to provide a solid fuel injection engine having an offset explosion chamber with which an air inlet passage is arranged in a manner so that sufficient air is introduced therethrough into a cylinder during the suction stroke to cause complete combustion of the maximum fuel charge.

A further object of my invention is to provide a solid fuel injection engine having an offset explosion chamber with which an air inlet passage is arranged to cause turbulence within the cylinder such that the fuel will be uniformly distributed in the compressed air previous to ignition.

Still another object of the invention is to provide a four-cycle engine having an offset explosion chamber into which air and liquid fuel are introduced in a manner to obtain complete combustion when the engine is running at high speeds.

Other objects of the invention will appear from the following description taken in connection with the drawing forming a part of the specification, in which.

Figure 1:
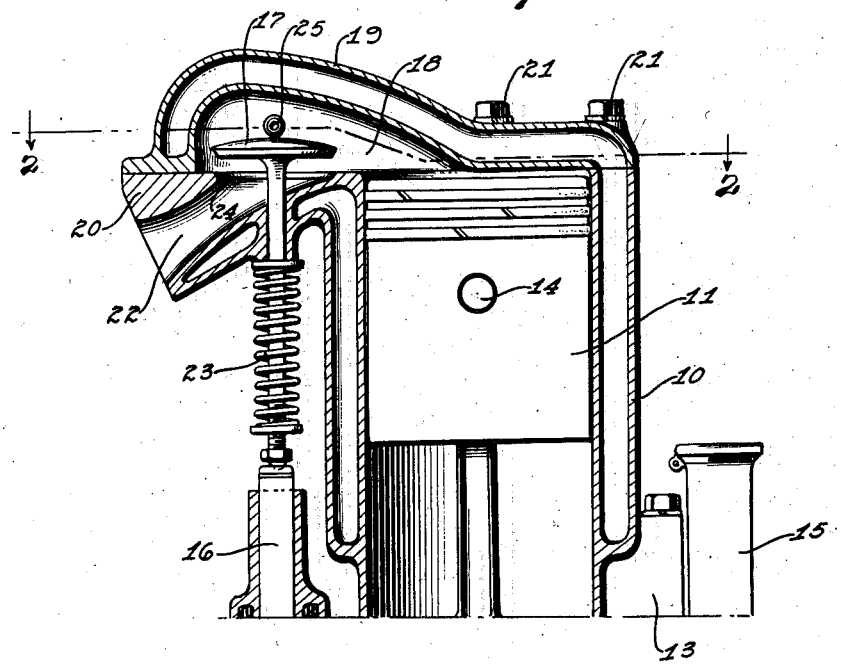
Fig. 1 is a medial vertical sectional view of an engine cylinder incorporating the invention.
Figure 2:
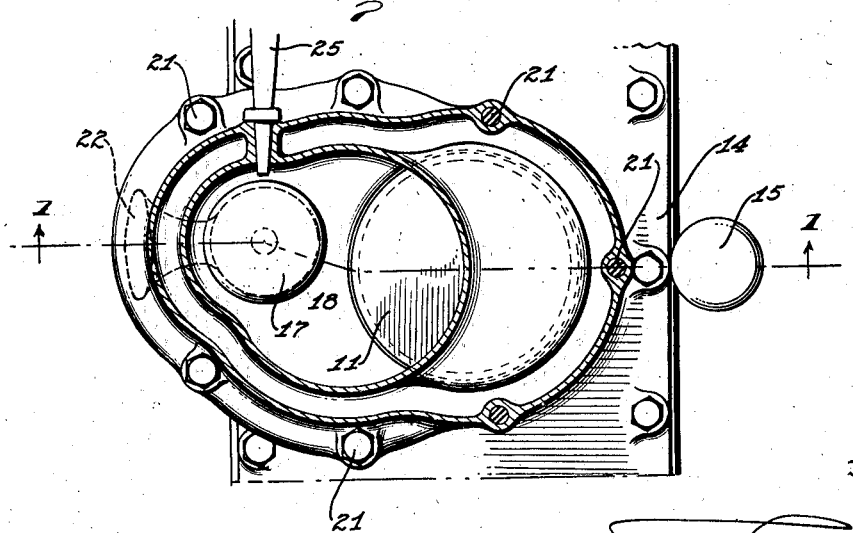
Fig. 2 is a horizontal sectional view of the same taken on line 2—2 of Fig. 1.

Referring now to the drawing by characters of reference, 10 represents a water cooled cylinder of an internal combustion engine in which the piston 11 is arranged to reciprocate, the piston having a rod extending into the crank case 13 and attached thereto by the pin 14. An oil filler tube 15 is arranged at one side of the cylinder while mechanism 16, for operating the valve 17, is arranged at the opposite side of the cylinder.

A partially offset head is arranged at the top of the cylinder so that the combustion chamber 18 extends partially above the cylindrical portion of the cylinder and partially offset therefrom. The cylinder head is formed by the member 19 and an offset portion 20 extending from one side of the end of the cylinder. The member 19 is secured to the cylinder structure by means of the bolts 21, suitable leak preventing means being associated between the head member and the cylinder. The head closure member is formed to extend directly across a portion of the open end of the cylinder and to slope upwardly from a line centrally across the cylinder, such sloping portion continuing its rise substantially to the extreme offset portion of the head where it curves into a vertical end wall. It will be seen that the combustion chamber therefore starts approximately centrally of the cylinder and increases in area across the remainder of the cylinder and its extension 20.

In order to obtain sufficient air in a four-cycle engine so that there will be complete combustion of the maximum fuel charge when running at a high speed, I provide a passage 22 through the wall of the offset portion of the chamber which is formed and arranged to assist in the movement of a desired quantity of air therethrough, and also, to assist in directing the air to impart turbulence after entrance in the cylinder for carburetion purposes. This invention is particularly adapted for engines of the type in which air and liquid fuel are introduced separately and directly into the combustion chamber. The passage 22 is in the form of a venturi and extends tangentially of the cylinder and at one side of the combustion chamber wall. The passage is furthermore formed to extend upward at an angle inclined to the axis of the cylinder. It will therefore be seen that the venturi will accelerate the movement of air through the passage, while the angular and tangential arrangement will cause incoming air to strike the curved top of the chamber, which deflects it into the cylinder so that it will rotate spirally therein without any substantial loss in speed, except for friction, until compressed to fuel ignition temperature by the piston.

The valve 17 has a stem which is associated with the tappet 16, and a coil spring 23 normally retains the valve closed against the seat 24 at the junction of the passage and the combustion chamber. The tappet 16 is operated from the crank shaft by conventional mechanism (not shown).

An injection nozzle 25 extends through the wall of the offset portion of the combustion chamber and is arranged to extend transversely to the direction of rotation of compressed air in the chamber. The injection device can be of a conventional type which will finely atomize liquid fuel and project it into the chamber under a high pressure so that it will penetrate substantially to the axis of the compressed air rotating in the combustion chamber prior to ignition. The valve 17 is arranged to be held open during the exhaust and intake strokes of the piston and to be closed during the compression and working strokes of the piston.

The engine illustrated is known generally as the Ricardo head type, the advantages of which are well know in the industry, and it is with this type of engine that I have provided for the introduction of a proper quantity of air and its circulation which results in complete combustion through compression at a high speed.

It will be understood that various forms of the invention other than that described above may be used without departing from the spirit or scope of the invention.

What I claim is:

1. In an internal combustion engine in which air fuel are introduced separately into the combustion chamber, a cylinder structure having a piston bore extending therethrough and an offset wall portion extending from one end thereof normal to the axis of the bore, a head extending across the end of the cylinder structure formed with the offset wall, said head having a curved inner wall surface forming a combustion chamber with the cylinder structure which partially overlies the cylinder bore, air inlet passage means leading into the combustion chamber at an angle to direct the incoming air against the curved inner surface of the head at a point overlying the cylinder bore, and means for injecting charges of liquid fuel into the combustion chamber.

2. In an internal combustion engine of the type in which liquid fuel and air are introduced separately into the combustion chamber, a cylinder structure having a piston bore extending therethrough and formed with an offset wall portion extending from one end thereof normal to the axis of the bore, a head extending across the end of the cylinder structure formed with the offset wall, said head having an inner wall surface forming with the cylinder structure a combustion chamber which extends over the offset wall and partially over the cylinder bore, the inner wall portion of the head beyond the bore extending at an angle from the axis thereof, air inlet passage means leading into the combustion chamber at an angle to direct incoming air against the inner wall portion of the head overlying the cylinder bore, and means for injecting charges of atomized liquid fuel into the combustion chamber.

3. In an internal combustion engine of the type in which air and liquid fuel are introduced separately into the combustion chamber, a cylinder structure having a piston bore extending therethrough and a laterally extending wall portion at one end thereof, a head extending across the end of the cylinder structure having an offset wall, said head having an inner surface forming with the cylinder structure a combustion chamber partially overlying the cylinder bore and the laterally extending wall portion, the inner wall portion of the head overlying the bore extending at an angle from the adjacent end of the bore, an air inlet Venturi passage leading into the combustion chamber and extending through the laterally extending wall portion of the cylinder structure, said passage extending at an angle to the cylinder bore and in a relation to direct incoming air against the inner wall of the head portion overlying the bore, and means for injecting atomized charges of liquid fuel into the combustion chamber.

4. In an internal combustion engine of the type in which air and fuel are introduced separately into the combustion chamber, a cylinder structure having a piston bore extending therethrough and an offset wall portion extending from one end of the bore and normal to the axis thereof, a head extending across the end of the cylinder structure formed with the offset wall, said head having an inner surface forming with the cylinder structure a combustion chamber overlying the offset wall portion and a portion of the bore, a passage leading through the offset wall portion for directing the incoming air against the inner wall of the head overlying the cylinder bore, said passage being arranged to direct the incoming air against one side of the head wall overlying the bore to cause rotation of the air upon deflection into the cylinder bore, and means for injecting atomized charges of liquid fuel into the combustion chamber.

5. In a compression-ignition type of engine in which air and fuel are introduced separately into the combustion chamber, a cylinder structure having a piston bore extending therethrough and an offset wall portion extending laterally from one end thereof, a head extending across the end of the cylinder structure formed with the offset wall, said head having an interiorly curved wall surface forming with the cylinder structure a combustion chamber which overlies a portion of the cylinder bore and the offset wall portion, the interior wall of the head forming the combustion chamber extending at an angle from the end of the cylinder bore, an air inlet passage leading into the combustion chamber, a piston in the cylinder bore, the inner head wall forming the combustion chamber extending in a direction to deflect compressed air forced into the combustion chamber by the piston toward the offset wall, and means for injecting atomized charges of liquid fuel across the combustion chamber.

In testimony whereof I affix my signature.

MILTON TIBBETTS.